May 3, 1932.  C. B. SPASE  1,856,735
MULTIPLE DISK CLUTCH
Filed May 15, 1930
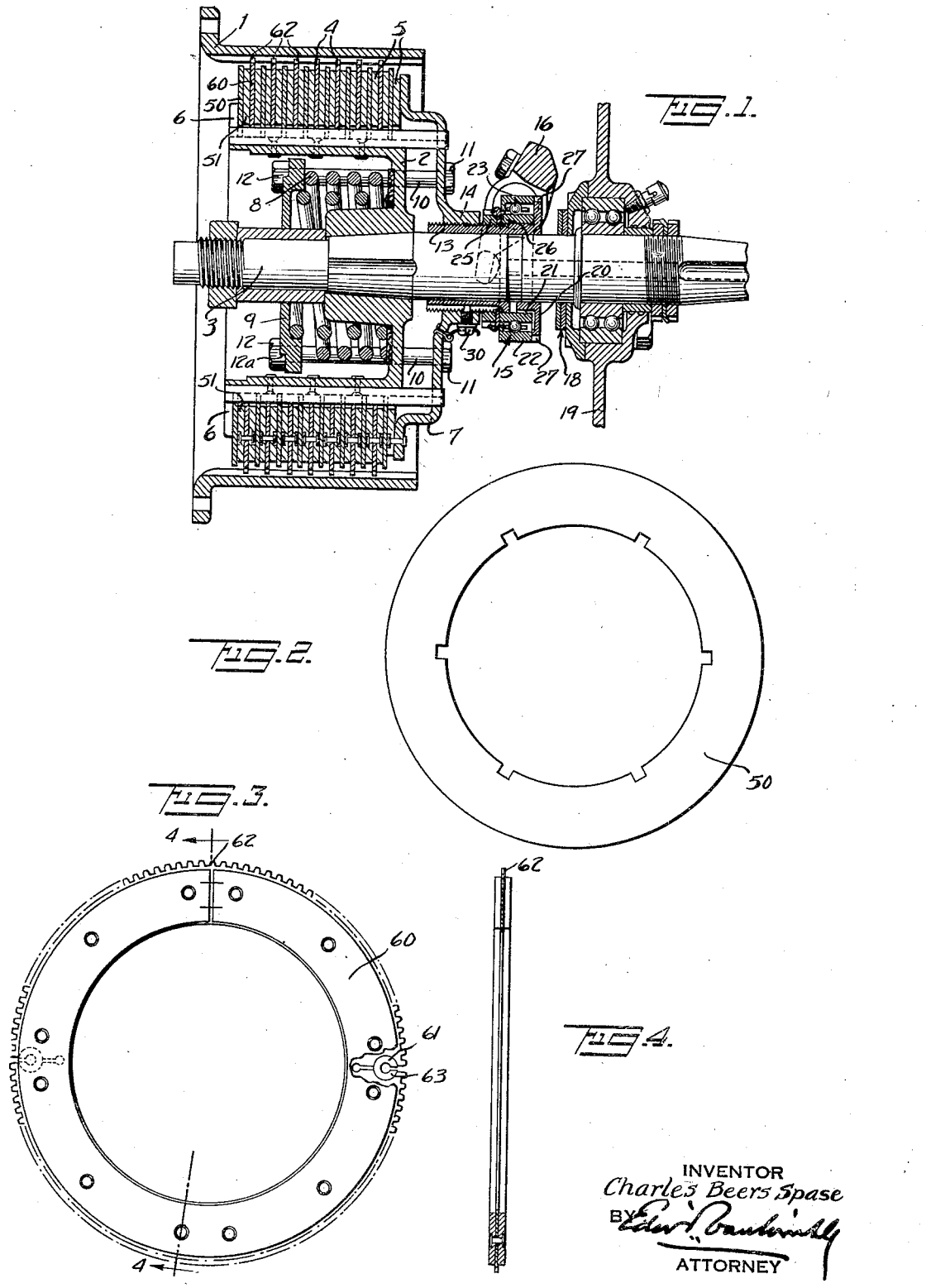
INVENTOR
Charles Beers Spase
BY
ATTORNEY Patented May 3, 1932                                                    1,856,735

UNITED STATES PATENT OFFICE

CHARLES BEERS SPASE, OF SYRACUSE, NEW YORK

MULTIPLE DISK CLUTCH

Application filed May 15, 1930. Serial No. 452,704.

My invention relates to friction clutches, such as are used in motor vehicles and has for its object to produce a clutch that will obviate clutch noise.

Since internal combustion engines supply the motive power for most automotive vehicles and since the torque from such engines is interrupted and not continuous, clutches of the multiple disk type when used with such engines are noisy due to this interrupted flow of power.

The noise is set up by the teeth or keys in the driving drum being impacted against the teeth of the driving members since a certain amount of back-lash or looseness must prevail to facilitate the releasing of the clutch from driving effort. The same condition holds true for the driven member which acts in a like manner against the driven drum keys or teeth.

The object of my assembly is to create a condition of solid contact between the driven and driving means thus eliminating the noise.

The foregoing and other features of my invention will now be described in connection with the accompanying drawings forming part of this specification in which similar characters of reference indicate like parts after which I shall point out in the claims those features which I believe to be new and desire to secure by Letters Patent.

In the drawings:

Figure 1 is a vertical section of one form of clutch embodying my invention.

Figure 2 is a detail of a driven plate.

Figure 3 is a detail of a driving plate.

Figure 4 is a section 4—4, Figure 3.

I have here illustrated my invention as embodied in a friction clutch of the multiple disk type.

1 designates the driving element which as will be understood by those skilled in the art, is usually in the form of a drum fixed to the fly wheel of the internal combustion engine of the vehicle.

2 is a driven element which comprises a head or internal drum mounted within the drum 1 on a shaft 3 arranged coaxially with the drum 1.

4 and 5 are sets of interleaved friction disks interlocked respectively with the drum 1 and drum 2 and shiftable axially thereof, the disks thrusting at the inner end of the drum 2 against an abutment 6.

7 is a pressure plate thrusting against the outer end of the series of disks to compress them toward the abutment 6; and 8 is the main spring here shown as located in the drum 2 and thrusting at its inner or rear end against the head of the drum 2 and at its outer end or front against the slidable spring abutment 9 which is connected to the pressure plate by bolts or tie rods 10 extending through holes in the pressure plate 7, the head of the drum 2 and in the abutment 9, the rods having heads 11 and 12 at their ends thrusting against the abutment 9 and the outer face of the pressure plate 7, one head of each rod or bolt being a nut adjustable to adjust the tension of the spring.

The means for operating the pressure plate against the action of the spring 8 to release the clutch comprises a sleeve 13 movable axially of the shaft 3 in the rear of the pressure plate and connected to the pressure plate by an adjustable connection, the sleeve being here shown as externally threaded and the pressure plate, as having a hub 14 threading on the sleeve 13. The sleeve 13 has a throw out bearing 15 associated therewith, with which coacts the throw out yoke 16, the latter being operated by the clutch pedal or lever in the usual manner.

The foregoing is a simple description of a friction clutch of the multiple disk type. In order to provide the condition of solid contact between the driven and driving means I make one of the driven disks 5 preferably the end one 50, a tight fit on the keys or teeth 51 of the driven drum 2.

One of the driving disks 4, preferably the end one 60, is provided with an expansion feature 61 that expands the periphery of the disk 60 making solid contact in the driving drum 1. The plate 60 is provided with teeth 62 which mesh with internal teeth in the driving drum 1 and normally the looseness is such that the plates are free to slide. The plate 60 is cut part way through its periphery and formed to receive an expansion spring 63. This expansion spring 63 is pressed into place and constantly exerts an expanding force which makes solid contact between the plate 60 and the drum 1.

Thus when all the disks are spring loaded, all the disks both driving and driven, possess their usual backlash or looseness except these two which subsequently hold the rest of the clutch disks in a position which does not change, thus obviating the noise incident to the interrupted torque of the engine as relates to clutches only.

Figure 2 shows a driven disk with six slots which are carefully machined so as to be a press fit on the keys of the drum.

Figures 3 and 4 show the driving disk assembly with two expansion inserts which tend to expand the disk so that it will compensate for the backlash in the driving drum and thus be a snug fit therein.

I wish it distinctly understood that my multiple disk clutch herein described and illustrated is in the form in which I desire to construct it and that changes or variations may be made as may be convenient or desirable without departing from the salient features of my invention and I therefore intend the following claims to cover such modifications as naturally fall within the lines of invention.

1. In a friction clutch of the multiple disk type, a driving disk provided with slots cut part way through the ring and adapted to receive expansion rings within the slots.

2. In a friction clutch of the disk type, a driving disk provided with a slot cut part way through the disk, a hole in the disk intermediate the ends of the slot, an energized wedge within the hole to forcefully open the slot for expanding the periphery of the disk.

In testimony whereof I affix my signature.

CHARLES BEERS SPASE.